United States Patent
Zucholl

Patent Number: 5,628,895
Date of Patent: May 13, 1997

[54] CLOSED CIRCUIT FOR TREATING DRINKING WATER WITH UV TREATMENT AND FILTERING

[76] Inventor: Klaus Zucholl, Sentastrasse 31, 68199 Mannheim, Germany

[21] Appl. No.: 400,250

[22] Filed: Mar. 8, 1995

[51] Int. Cl.$^6$ .......................... B01D 17/12; B01D 36/00
[52] U.S. Cl. .................. 210/85; 210/87; 210/91; 210/96.1; 210/143; 210/195.1; 210/192; 210/259; 210/266; 210/282; 422/186.3
[58] Field of Search .................... 210/85, 96.1, 137, 210/138, 143, 167, 192, 196, 195.1, 257.1, 257.2, 258, 259, 261, 264, 266, 282–284, 903, 194, 900, 87, 91, 94, 136, 464, 472, 473; 422/186.3, 56–64, 384

[56] References Cited

U.S. PATENT DOCUMENTS

| | | |
|---|---|---|
| 3,870,033 | 3/1975 | Faylor et al. .................. 210/900 |
| 4,804,464 | 2/1989 | Schevey ...................... 210/195.1 |
| 4,849,100 | 7/1989 | Papandrea ................... 210/266 |
| 4,902,411 | 2/1990 | Lin .............................. 210/195.1 |
| 4,909,931 | 3/1990 | Bibi ............................. 210/85 |
| 5,024,766 | 6/1991 | Mahmud ...................... 210/195.1 |
| 5,089,144 | 2/1992 | Ozkahyaoglu et al. ........ 210/87 |
| 5,192,424 | 3/1993 | Beyne et al. ................. 210/91 |
| 5,227,053 | 7/1993 | Brym .......................... 210/266 |
| 5,290,442 | 3/1994 | Clack ......................... 210/266 |

*Primary Examiner*—Joseph W. Drodge
*Attorney, Agent, or Firm*—Spencer & Frank

[57] ABSTRACT

A description is given of processes and machines for the treatment of drinking water, preferably in the domestic sector. With these processes and machines, undesirable constituents, for example organic and inorganic substances which are harmful to health, can be removed from the drinking water or microbial contaminations reduced. For this purpose, the technologies of ion exchange, adsorption at surfaces and sterilization by means of UV light are applied. As a result of taking account of the physico-chemical parameters of the water and the various operational states in the regulation of the process, the exhaustion of the filter cartridge is monitored and a change in the quality of the treated water with operating time is avoided. Bacterial contaminations of the water are avoided by advantageous embodiments of the UV sterilization device. Since the feedstock container can accommodate both the water to be treated and also the treated water, a low space requirement results for the treatment machine.

11 Claims, 2 Drawing Sheets

CLOSED CIRCUIT FOR TREATING DRINKING WATER WITH UV TREATMENT AND FILTERING

BACKGROUND OF THE INVENTION

The invention relates to processes and machines for the local treatment of drinking water by means of ion exchange, adsorption at surfaces and UV irradiation. The basic processes for the treatment of drinking water by means of ion exchange, for example the softening or decarbonization of drinking water, the removal of nitrate ions by means of nitrate-selective exchanger resins or the adsorption of organic impurities on active carbons or molecular sieves, are sufficiently known and are used in numerous processes and appliances. Appliances employing these processes are offered by various companies for the treatment of drinking water in the domestic sector. For example, the water filter jugs of the BRITA company for the softening of water (referred to below as table-top appliances) or the water filter systems of the BIOLIT company for the removal of nitrate and designed for direct connection to the water pipeline (referred to below as tapping-point appliances) are known. Essential components of these appliances are filter cartridges filled with ion exchangers and active carbon. The filter cartridges have only a limited capacity and therefore have to be replaced or regenerated regularly.

The known processes and appliances have, however, several basic weak points which are decisively improved by the processes described here and their embodiments. Problems in the case of the known appliances are, on the one hand, the risk of bacterial contamination of the drinking water and, on the other hand, the fact that the monitoring of the exhaustion of the used filter cartridge has been solved only to an inadequate extent. Furthermore, in the case of these appliances, the theoretically possible filter capacity of the filter materials used is only utilized to an insufficient extent because of the simple control of the process. In addition, the water quality of the treated water varies very considerably with the operating time of the filter materials used in the appliances. Furthermore, the known table-top appliances need separate feedstock tanks for the untreated and treated water.

SUMMARY OF THE INVENTION

An object of the invention is to provide a process and appliance for the treatment of drinking water which avoids the abovementioned disadvantages. The above and other objects are accomplished according to the invention by the provision of portable water treatment machine, comprising: a closed circuit water circulation system including a system of pipes and a water container, a water pump, and a filter cartridge connected in series by the system of pipes; a UV radiation lamp disposed for irradiating water in the circulation system; and an electronic control device for controlling the pump and the UV radiation lamp; the improvement wherein: the water container comprises a removable water jug having a top with an opening; the filter cartridge comprises a plurality of replaceable filter cartridges having respectively different internal designs and filter materials and being connectable in the pipe system; nonreturn valves are connected at ends of the pipes connected to the water container and the filter cartridge for automatically opening the pipe ends when the water jug and the filter cartridge, respectively, are inserted into the machine and which close the pipe ends when the water jug and filter cartridge, respectively, are removed from the machine; a water meter is connected to the pipe system; a UV sensor is arranged in a radiation region of the UV radiation lamp; and the electronic control device includes means for regulating at least one of circulation of the water in the closed circuit and the UV radiation, the regulating being a function of at least one of (a) an amount of water circulated from a time one of the replaceable filter cartridges is inserted into the machine, (b) characteristic data of the inserted filter cartridge, and (c) a measured value of the UV sensor, for obtaining an optimum utilization of the filter cartridge and of the UV radiation lamp, and for attaining a desired water quality. Further advantageous embodiments and further developments of the inventive idea emerge from the detailed description below considered in conjunction with the accompanying drawings.

In the case of the processes and appliances according to the invention, an advantageous embodiment of the UV irradiation of the drinking water which is known and well-established in the treatment of drinking water is applied to sterilize and avoid the bacterial recontamination of the drinking water. According to the invention, the untreated water can be sterilized before entering the filter cartridge and a bacterial contamination of the filter cartridge can consequently largely be avoided by a repeated UV irradiation, which is achieved with only one UV lamp. If some bacteria are not immediately killed in the case of very high bacterial counts in the water and reach and pass through the filter cartridge, the bacteria are killed in a second irradiation in the feedstock jug or in a second irradiation reactor upstream of the water draw-off point of the water-treatment machine. A further sterilization can also be achieved by repeated circulation of the water inside the water-treatment machine. The UV dose ratings needed to ensure an adequate sterilization can be measured by means of a UV sensor and ageing phenomena in the UV lamp can largely be compensated for by means of extended irradiation times or slower flow rates of the water and the service life of the UV lamp markedly increased. A discontinuous mode of operation of the UV lamp which is suited to the requirement also increases its service life and results in a lower energy consumption than in the case of the continuous mode of operation generally used. Monitoring, regulation and control of the treatment of the drinking water by means of sensors and microcontrollers ensure a good and largely constant quality of the treated water, accompanied by simultaneous good utilization of the filter materials needed for the treatment of the water.

The small overall volume which can be achieved by a special water circulation system and the short-term provision of relatively large amounts of water, even and in particular with relatively small amounts of filter materials, are furthermore advantageous. The facility for taking account of the quality of the untreated water and its variation and for influencing the quality of the water produced in a defined way is furthermore advantageous in the case of a special embodiment of the process.

For example, the filter capacity of a decarbonization filter (comparable relationships also apply to other types of ion exchangers, active carbons or molecular sieves) and the quality of the water treated therewith are known to depend on the flow rate of the water (bed volume per unit time, "bed loading") and the chemical composition of the water, in this case its temporary hardness in particular. The higher the flow rate of the water through the filter is, the poorer is the quality of the treated water. In addition, the so-called "breakthrough" of the species to be removed through the filter takes place earlier at a high flow rate. This effect manifests itself ever more strongly with increasing loading of the filter until, finally, the quality of the water to be treated no longer meets the target requirements and the filter has to be replaced. The total filter capacity of the resin is only poorly utilized in this case. In the case of low water flow rates, the so-called "breakthrough curve" of the filter cartridge becomes steeper, which is equivalent, in this case, with a better utilization of the filter capacity. The same effect also operates analogously for various concentrations of the species to be removed from the water. For higher concentrations, a lower water flow rate should be established than for low concentrations. It is advantageous to keep the bed loading of the filter as low as possible for the purpose of good utilization of the filter capacity. This can be achieved by using very large amounts of filter materials and/or by means of very low water flow rates. In practice, both come up against limits, in particular if applied in a tapping-point appliance or table-top appliance described here. The size of the filter cartridge is, for example, limited by the space available in the appliance; the long service times of the filter cartridge which can be achieved in the case of very large amounts of filter materials increase the risk of bacterial contamination of the cartridge; furthermore, a uniform flow in the cartridge is difficult to achieve in the case of very large cartridges and low flow rates. On the other hand, provision of treated water in acceptable times is easier to achieve with large filter cartridges.

The known water filter systems do not take account of these factors in the way the process is carried out or take account of them inadequately and consequently produce a poor quality of water, offer a poor utilization of the capacity of the filter materials and require long treatment times, and there is the risk of bacterial contamination. No control and regulation is carried out on the basis of parameters which are important from the point of view of processing. The alterations in the filter properties during the operating time are not taken into account. Alterations in the quality of the water to be treated are also not detected. An adjustment facility may be expedient, for example, in the case of a decarbonization filter. For health reasons, an almost complete removal of calcium and magnesium ions from the water is generally undesirable. However, this may occur, in particular, in the case of those waters in which all or most of the water hardness takes the form of temporary hardness.

The embodiment according to the invention of the water treatment process avoids the disadvantages mentioned. In relation to control and regulation, it takes account of the quality of the water to be treated, the nature and the degree of exhaustion of the filter cartridge used and the desired quality of the water product. Simultaneously, the water is sterilized by an advantageous embodiment of a UV irradiation and a bacterial recontamination of the water product is avoided. Depending on requirements, the parameters necessary for regulation and control are either entered by the user or measured by sensors. The following parameters are particularly of interest in this connection: the chemical composition of the untreated water, in particular the temporary hardness, the total hardness, the nitrate content, the sulfate content, the chloride content, the electrical conductivity and the pH. Also considered are physical variables such as the circulation time, the known amount of water since the use of the filter cartridge, the nature and size of the filter cartridge used, the operating time of the filter cartridge since the last water intake or the water level in the feedstock container. One or more of the abovementioned parameters may be taken into account in the control and regulation of the process. According to the invention, in the case of the process, the flow rate of the water may, for example, be reduced with increasing concentration of the species to be removed, with increasing concentration of the interfering ions influencing the process (for example, sulfate content in the case of the removal of nitrate ions by means of nitrate-selective resins; the capacity of most nitrate-selective resins decreases with increasing sulfate content of the water) and with increasing degree of loading of the filter cartridge. If necessary, the water to be treated may also be treated in the filter cartridge several times in succession. If the water treated is left too long in the feedstock container or the filter cartridge is inadequately rinsed, bacterial contamination may occur under unfavorable circumstances. Such operating states can be avoided by an automatic, time-dependent circulation and UV irradiation, A determinable residual hardness of the treated water may furthermore be obtained, according to the invention, by dilution with only partly filtered water. The dilution can be carried out by using a filter cartridge which comprises a plurality of separate filter stages and in which the processing routes through the cartridge are chosen automatically by the appliance or manually by the user. An example of this is specified in FIG. 2. A further possibility according to the invention of obtaining the residual hardness makes use of the fact that the various chemical reactions in the water treatment may proceed at different rates. Chemical decarbonization reactions at ion exchangers normally proceed more slowly than chemical reactions at nitrate-selective ion exchangers or active carbons. If the bed loading is correctly chosen, a certain residual hardness may be obtained during the water treatment in a filter cartridge filled with the three abovementioned materials after the passage of the water, whereas the other undesirable water constituents are removed. Since, for a constant residual hardness, the optimum value of the bed loading decreases with increasing exhaustion of the ion exchanger, control or regulation of the procedure is expedient.

The control and regulation of the process provides a good utilization of the filter capacity of the cartridges, accompanied by simultaneously good and substantially constant quality of the treated water. The technology needed for this purpose, such as, for example, the use of programmable microcontrollers, is known and does not need to be described further here.

It is furthermore advantageous that filter cartridges of different size and matched to the water requirement can be used and the filter capacities can be optimally utilized, in particular, even in the case of small cartridges. It is furthermore particularly advantageous that a small design of the appliance can be achieved as a result of the circulation process which is described in the exemplary embodiments and in which the water container for the water to be treated may be identical to the water container for the treated water. In this case, the treated water is fed back into the water jug in such a way that it forms a layer on the water still to be treated as far as possible without mixing. Large amounts of water may be stored by using the water container as a buffer store, while the actual treatment time of the water can be chosen advantageously from a processing point of view. At the same time, the water treatment time remains within acceptable limits for the user.

BRIEF DESCRIPTION OF THE DRAWINGS

The invention is described in greater detail below by reference to exemplary embodiments from which further important features emerge.

DETAILED DESCRIPTION OF THE PREFERRED EMBODIMENTS

Figure 1:
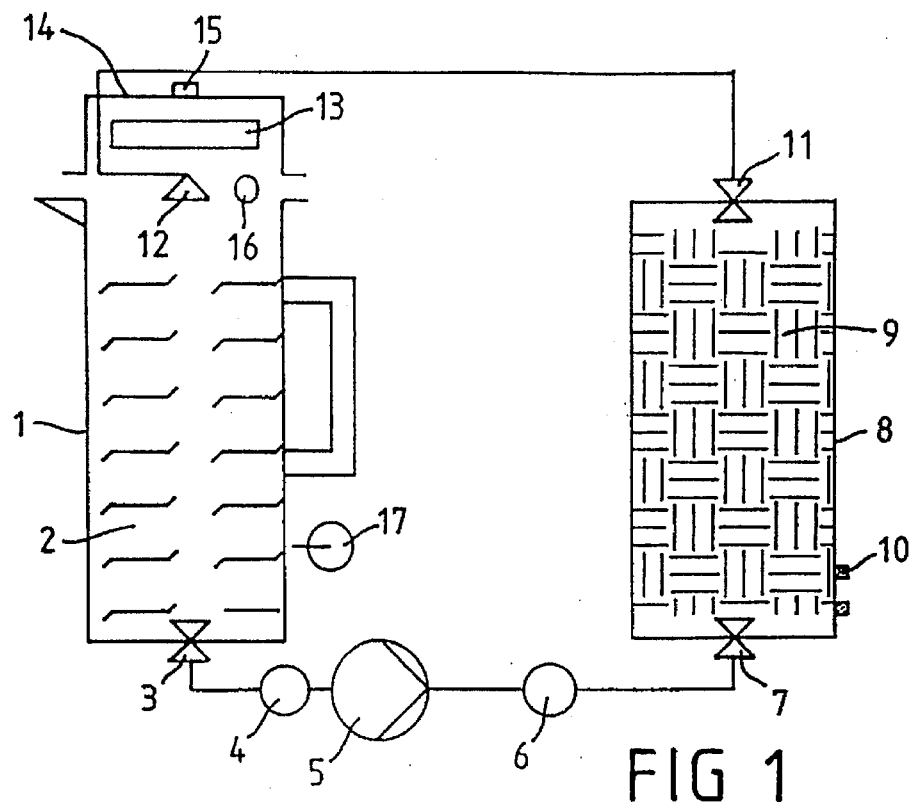
FIG. 1 shows diagrammatically the structure of a first embodiment of the process according to the invention.

According to FIG. 1, a removable water jug 1 is filled with the water 2 to be treated and placed in the water-treatment machine. In this arrangement, the nonreturn valve combination 3 prevents the water from being able to escape while the jug is being filled or the water from being able to escape from the appliance. When the jug is mounted, the passage of the nonreturn valve combination is opened. On the basis of the hydraulic pressure of the water column in the jug, the pressure sensor 4 determines the filling level or the amount of water to be treated. Alternatively, the filling level can also be measured by a filling-level sensor 16. Suitable sensors for this purpose, for example ultrasonic distance measuring devices, are prior art. The water treatment is initiated by the control and regulating electronics (not shown) by manually pressing a start button. Alternatively, replacement of the water jug 1 can be detected by a sensor 17 of the appliance and the water treatment automatically initiated. The electronics of the appliance then activate the UV lamp 13 which sterilizes the water 2 contained in the jug by irradiation, and then the pump 5, which conveys the water continuously or in batches through an electrical water meter 6, then through a nonreturn valve combination 7, through a filter cartridge 8 and then via the nonreturn valve combination 11 to the backflow distributor 12. In this connection, the backflow distributor 12 is designed so that the water flowing back into the jug is formed as a layer on the water contained in the jug, if possible without mixing. The nonreturn valve combinations 7 and 11 have the task of preventing an escape of water from the cartridge or the appliance when the filter cartridge 8 is replaced. They become passable after the filter cartridge has been inserted. Alternatively, the filter cartridge may also be constructed in bottle form, with a connection situated at the top on one side. In this case, the second connection of the cartridge is brought upwards inside or outside the latter. As a result, no water can escape from the filter while the latter is being replaced even without a closure valve. The filter cartridge 8 comprises one or more chambers filled with the water-treatment materials 9 themselves. Here various known materials are used for water treatment, depending on the application purpose. For example, weakly acidic cation exchangers in the hydrogen form are used to decarbonize the water, nitrate-selective anion exchangers are used to remove nitrates, selective cation exchangers are used to remove heavy metals and active carbon or silver-treated active carbon, which simultaneously retards the growth of microorganisms, is used to remove organic impurities, odorous and flavoring substances, and chlorine and chlorinated hydrocarbons. The filter cartridge may furthermore contain fine filters for removing particles or microorganisms. Because of the variety of waters to be treated and the claims on the part of the users relating to the desired water quality, it is expedient to produce various filter cartridges for the water-treatment machine. In order to optimize the regulation of the water-treatment machine, data relating to the filter cartridge used such as, for example, type and amount of the filling, number of filter chambers or filter capacities for various bed loadings and interfering ion concentrations must be known to the regulating electronics. This can be done either by manual entry by the user, but preferably by means of machine-readable markings 10, such as, for example, by means of a bar code or by mechanical embossings on the filter cartridge. Detailed filter data may expediently already be stored in the control electronics and the coding on the cartridge or the manual entry is then simplified considerably (for example, only a code number).

Those data relating to the quality of the untreated water and the desired quality of the treated water that are necessary for the control and regulation are communicated by the user of the appliance to the electronics in the embodiment shown here by means of suitable input tools, for example a keyboard. The activation of the pump 5 and consequently the continuous or batchwise optimum delivery rate and amount delivered are selected on the basis of these data and the amount of water which has already flowed through the filter cartridge. Batchwise conveyance may reduce the power consumption of the feed pump and continuous pump regulation is unnecessary. The data on amounts delivered can be measured by means of the water meter 6 or, in the case of lower requirements relating to accuracy, may also be calculated from the operational data of the circulating pump (for example, power drawn, rotary speed and operating time). After the filter cartridge has been exhausted, the appliance switches off. The user may already be prepared beforehand for the fact that a filter change will soon be necessary by an indicator on the appliance.

The treated water is sterilized in the jug 1 and kept free of bacteria. For this purpose, the water is irradiated with UV light by a UV lamp 13 which is seated in a reflector housing 14. The reflector housing comprises, at least on the inside, a material having high UV reflectivity, in particular aluminum. The water can be irradiated continuously. However, after sterilization has taken place, it is generally sufficient to irradiate the water stored in the jug for several seconds at time intervals of several hours to avoid bacterial recontamination. Ageing of the lamp can be measured by a UV sensor 15. The electronics may then extend the irradiation times and consequently markedly increase the service life of the lamp. A fault in the UV lamp can be communicated to the user. For safety reasons, the UV lamp is switched off by means of the sensor 17 when the jug is removed from the appliance.

Figure 2:
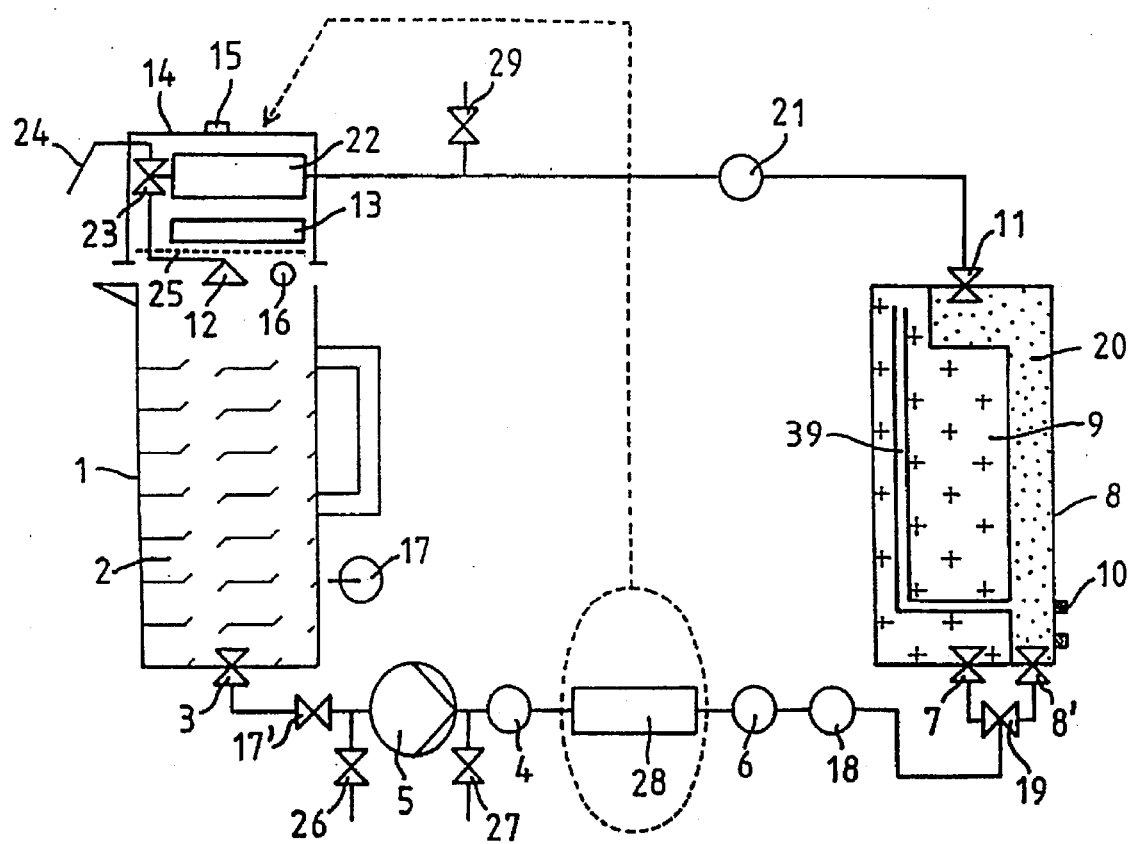
FIG. 2 shows a further embodiment of the process according to the invention and FIG. 3 shows a third embodiment of the process according to the invention.

FIG. 2 shows a further embodiment of the process according to the invention. The essential differences from the embodiment of the invention shown in FIG. 1 are the automatic determination and monitoring of the physicochemical water parameters, the facility for supplying the water to the appliance via a water connection or a feedstock container and for drawing treated water from the appliance via a faucet, also in defined amounts, and in the possibility of using multi-chamber filter cartridges for the sophisticated treatment of water, for example residual hardness maintenance.

The water 2 to be treated is conveyed out of the removable water jug 1 via the nonreturn valve combination 3 by means of the pump 5. The nonreturn valve 17' prevents water flowing back from the downstream parts into the water jug. Via the valve 26, there is a facility for supplying water from a separate storage container. Downstream of pump 5 it is possible to supply water to the machine from a water pipeline connection via the control valve 27. In this case, the pressure sensor 4 can signal an unacceptably high water pressure to the regulating electronics, whereupon the through aperture of valve 27 may be reduced. In the case of water being supplied from the water jug or from a separate feedstock container, the pressure sensor 4 can determine the filling level in the vessels from the hydraulic pressure of the water column. A filling-level sensor 16 prevents an overflow of the water jug if water is supplied to the water machine from a water cock or feedstock container. The water to be treated passes through the UV flow-type irradiation reactor 28 for the purpose of sterilization. Said flow-type irradiation reactor comprises a UV-transparent tube, preferably composed of quartz glass, and is situated, together with a further flow-type irradiation reactor 22, in the reflector housing 14 of the water jug. The water flows through the water meter 6 and then through a first sensor block 18. Said sensor block contains sensors which determine the physico-chemical water parameters which are of interest here, for example sensors for the temporary hardness, the total hardness, the nitrate content, the sulfate content, the chloride content, the electrical conductivity and the pH.

Figure 3:
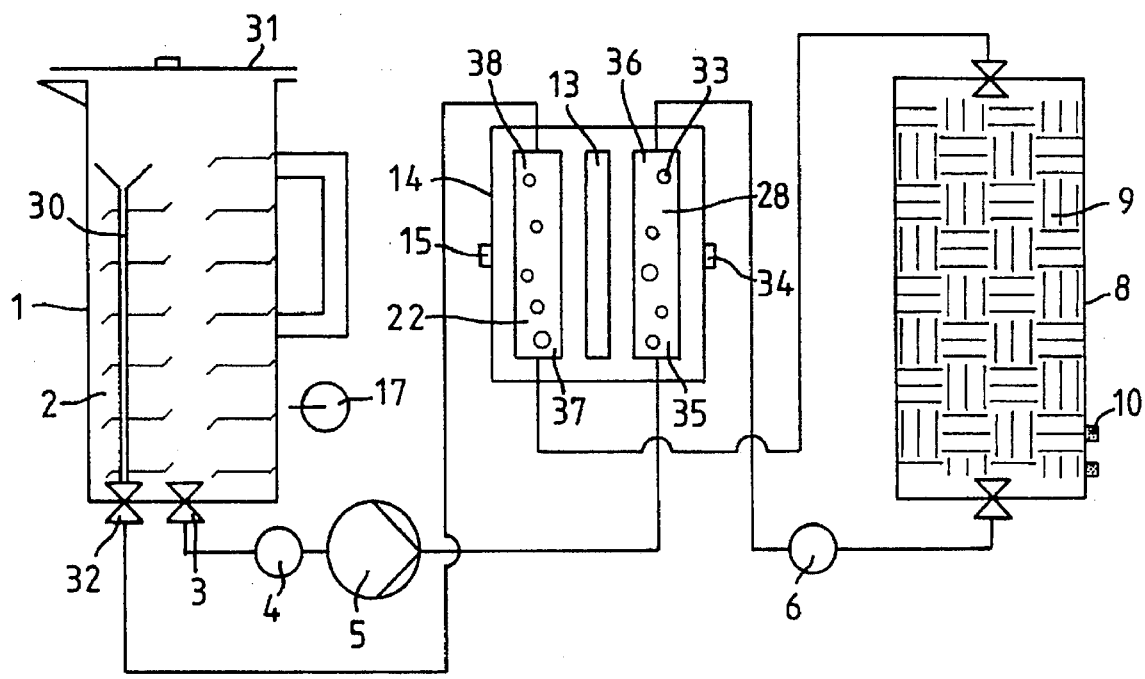

The water is then conveyed via a blending valve 19, through the nonreturn valve combinations 7 and 8', through a two-chamber filter cartridge 8 and then via the nonreturn valve combination 11 to a second sensor block 21. The chambers 9 and 20 of the filter cartridge 8, which are connected by the tube 39, are filled with different filter materials. The water paths through the filter cartridge are partitioned by means of the automatically or manually adjustable blending valve 19. The sensor block 21 also contains sensors for determining physico-chemical water parameters. As a result of the use of two sensor systems, precise differential measurements and consequently an optimum control of the process are possible. Alterations in the quality of the untreated water are also determined automatically. The sensor blocks 18 and 21 may optionally also be a component of the filter cartridge 8. This solution is particularly advantageous if the sensors have only a short service life. This is the case, for example, for the calcium sensors currently available. From the sensor block 21, the water flows through a second UV irradiation reactor 22, which is situated in a reflector housing 14, and is again irradiated therein by the UV lamp 13. A UV sensor 15 behind the reactor 22 measures the UV radiation intensity and is consequently able to detect aging phenomena of the UV lamp or deposits in the UV irradiation reactor 22. A UV-transparent safety screen 25 protects against contamination of, damage to or contact with the parts of the irradiation chamber. After sterilization, the water is fed back into the jug, via a switchover valve 23 or, as in FIG. 1, via a backflow distributor 12. Alternatively, the water may also be supplied via the switchover valve 23 to a faucet 24 and drawn off directly at that point. Actuation of the faucet automatically activates the water-treatment machine. The withdrawal of preset amounts of water is also possible by means of suitable electronic operating keys. Replenishment of the water jug 1 is furthermore possible via a water connection 29. In that case, the water is sterilized in the irradiation reactor FIG. 3 shows a third embodiment of the process according to the invention. In contrast to the versions shown in FIGS. 1 and 2, sterilization does not take place in this case in the water jug, but on the contrary, a separate UV sterilization cell is provided in this case. The version described below is generally adequate to treat waters with low bacteria contents and if the replacement intervals of the water and the filter cartridge are short.

The water 2 in the removable water jug 1 is pumped, via the return valve combination 3 and the pressure sensor 4, by means of the pump 5 through a first flow-type irradiation reactor 28 via the water meter 6 and the filter cartridge 8 through a second flow-type irradiation reactor 22 via a nonreturn valve combination 32 and a riser tube with diffuser 30 back into the water jug. The latter is protected against contamination by a closure 31. For the purpose of identifying it, the cartridge 8 has machine-readable markings 10. During circulation, the water is sterilized by irradiation with the UV lamp 13. The UV lamp 13 and the two flow-type irradiation reactors 22 and 28 are seated in a reflector housing 14. Seated behind the flow-type irradiation reactors in each case is a UV sensor 15 and 34, with which an aging of the UV lamp or a contamination of the flow-type irradiation reactors can be measured. The flow-type irradiation reactors contain purifying bodies 33 which are advantageously composed, for example, of UV-transparent glass beads. These are whirled up by the water flow and are able to remove mechanically any deposits on the tube walls. For this purpose, the UV irradiation chamber is expediently mounted vertically. The cleaning bodies whirled up furthermore bring about the formation of turbulent flows in the irradiation reactors and, consequently, a more uniform irradiation of the water than in the case of laminar flow. The avoidance of laminar flows is furthermore achieved by a special shaping of the inlet and outlet sections 35, 36, 37 and 38. In this connection, shapes which impress a spiral or turbulent profile on the water are preferred. A similar effect can be achieved by internals in the flow-type irradiation reactors.

I claim:

1. A portable water treatment machine, comprising: a closed circuit water circulation system including pipes and a water container, a water pump, and a filter cartridge connected in series by the pipes, the pipes including pipe ends connected to the water container and the filter cartridge; a UV radiation lamp disposed for irradiating water in the circulation system; and an electronic control device for controlling the pump and the UV radiation lamp; the improvement wherein:

the water container comprises a removable water jug having a top with an opening;

the filter cartridge comprises a replaceable filter cartridge selectable from a plurality of filter cartridges each having respectively different internal designs and filter materials and being replaceably connectable to the pipes;

nonreturn valves are connected at pipe ends connected to the water container and the replaceable filter cartridge for automatically opening the pipe ends when the water jug and the replaceable filter cartridge, respectively, are inserted into the machine and which close the pipe ends when the water jug and the replaceable filter cartridge, respectively, are removed from the machine;

a water meter is connected to the pipes;

a UV sensor is arranged in a radiation region of the UV radiation lamp; and the electronic control device includes means for regulating at least one of circulation of the water in the closed circuit system and the UV radiation lamp, the regulating being a function of at least one of (a) an amount of water circulated from a time the replaceable filter cartridge is inserted into the machine, (b) characteristic data of the replaceable filter cartridge, and (c) a measured value of the UV sensor, for obtaining an optimum utilization of the replaceable filter cartridge and of the UV radiation lamp, and for attaining a desired water quality.

2. The water treatment machine according to claim 1, wherein the filter cartridges each have markings arranged thereon for identification of the respective filter cartridge, and the regulating means includes means for recognizing the respective markings upon insertion of the filter cartridges into the machine and for selecting a corresponding regulating program in dependence of the recognized marking.

3. The water treatment machine according to claim 1, and further including physico-chemical sensors arranged in the pipes upstream and downstream of the replaceable filter cartridge for measuring physico-chemical parameter values of water flowing into and out of the replaceable filter cartridge; and means for calculating exhaustion of the replaceable filter cartridge based upon a difference of the measured values and using the calculated exhaustion for regulating a flow velocity of the water in the closed circuit system.

4. The water treatment machine according to claim 1, wherein the regulating means is for regulating a flow velocity of the water in the closed circuit system so that a defined remaining portion of water ingredients are left in the treated water.

5. The water treatment machine according to claim 1, wherein the replaceable filter cartridge is comprised of several chambers filled with different filter materials, with a communicative linking of the different chambers being adjustable by an opening and closing of valves.

6. The water treatment machine according to claim 5, wherein the replaceable filter cartridge includes parallel flow paths and the regulating means is for regulating a division of water flow to the parallel flow paths within the replaceable filter cartridge so that a defined remaining portion of water ingredients remains in the treated water.

7. The water treatment machine according to claim 1, wherein the UV radiation lamp is disposed in the machine above the water jug for radiating into the jug.

8. The water treatment machine according to claim 1, wherein the UV radiation lamp comprises a UV flow-type reactor disposed in the closed circuit and containing cleaning bodies which are set in motion by water flowing in the UV flow-type reactor.

9. The water treatment machine according to claim 1, wherein the regulating means comprises means for tracking time and for activating the pump and the UV radiation lamp after a defined idle time to avoid a bacterial recontamination of the water.

10. The water treatment machine according to claim 1, further comprising a return flow distributor in or above the water jug and being configured so that water flowing back into the water jug is layered on top of water contained in the water jug and only a small amount of mixing takes place.

11. The water treatment machine according to claim 1, further comprising a tap in one of the pipes from which treated water can be taken.

* * * * *